(12) United States Patent　　(10) Patent No.: US 6,499,792 B2
MacFarland　　(45) Date of Patent: Dec. 31, 2002

(54) MOTOR VEHICLE COVERING SYSTEM

(75) Inventor: David MacFarland, UnterschleiBheim (DE)

(73) Assignee: Dura Convertible Systems GmbH (DE)

( * ) Notice: Subject to any disclaimer, the term of this patent is extended or adjusted under 35 U.S.C. 154(b) by 0 days.

(21) Appl. No.: 09/825,427

(22) Filed: Apr. 3, 2001

(65) Prior Publication Data

US 2001/0033090 A1 Oct. 25, 2001

Related U.S. Application Data

(63) Continuation-in-part of application No. 09/409,543, filed on Sep. 30, 1999.

(30) Foreign Application Priority Data

Sep. 30, 1998 (EP) ............................................. 98118475

(51) Int. Cl.⁷ .................................................. B60J 7/00
(52) U.S. Cl. .................. 296/107.09; 296/122; 296/123
(58) Field of Search ............................ 296/107.01, 116, 296/122, 123, 107.09, 107.16

(56) References Cited

U.S. PATENT DOCUMENTS

| | | | |
|---|---|---|---|
| 960,979 A | 6/1910 | Martell | |
| 1,952,252 A | 3/1934 | Heuser | 296/107 |
| 2,704,225 A | 3/1955 | Anschuetz et al. | 296/107 |
| 3,271,067 A | 9/1966 | Rollman | 296/116 |
| 5,542,735 A | 8/1996 | Furst et al. | 296/107 |
| 5,769,483 A | 6/1998 | Danzl et al. | 296/107 |
| 5,903,119 A | 5/1999 | Laurain et al. | 318/265 |
| 6,048,021 A | 4/2000 | Sautter, Jr. | 296/117 |
| 6,139,087 A * | 10/2000 | Wolfmaier et al. | |

* cited by examiner

Primary Examiner—D. Glenn Dayoan
Assistant Examiner—Scott Carpenter
(74) Attorney, Agent, or Firm—Gardner, Carton & Douglas

(57) ABSTRACT

A method for opening a vehicle covering system for a convertible. The covering system has a first, second and third roof sections and a one-piece cover for stretching over all three roof sections. The three roof sections can be pivoted from an open position covering the vehicle to a terminal folded position within the vehicle.

6 Claims, 11 Drawing Sheets

MOTOR VEHICLE COVERING SYSTEM

This is a continuation-in-part of application Ser. No. 09/409,543, filed Sep. 30, 1999.

FIELD OF THE INVENTION

This invention relates to a method for opening a motor vehicle covering system for a convertible, especially for a four-seated convertible, comprising three roof sections.

SCOPE OF THE PRIOR ART

Open motor vehicles in the form of convertibles are enjoying growing popularity. Increasingly, these vehicles are not only being used as pure "fair weather" vehicles during the warmer seasons, but must also be capable of withstanding all weather conditions in order to serve as an alternative to conventional coupes.

However, this means that, on the one hand, stable covering systems are needed which are resistant to all weather conditions, especially to snow and ice during the winter, and which, on the other hand, can be quickly and easily opened and then closed again at any time and during any season.

As such vehicles are being used on a daily basis, there is an increased need to provide them with greater loading capabilities, so as to allow for the transport of larger amounts of luggage and items purchased for household and residential use, especially for convertibles with four seats that are used as family cars.

A particular disadvantage of the motor vehicle covering systems for four-seated convertibles known in the art is that they are bulky when in a folded state. This reduces load volume, especially in the trunk space. In addition, these motor vehicle covering systems generally protrude upward significantly past the tail end of the motor vehicle, thus creating an esthetically unsatisfactory overall impression.

SUMMARY OF THE INVENTION

Therefore, the main objective of this invention is to provide a method for opening a motor vehicle covering system for convertibles, especially for four-seated convertibles, that allows the covering system to be easily folded open and closed and to be exceptionally space-saving when in its folded position.

This objective is solved by the features of claim 1.

Accordingly, the present invention provides a method for opening a vehicle covering system for a convertible comprising the following steps: providing a vehicle with a vehicle covering system comprising a first, front roof section, a second, central roof section, a third, rear roof section and a one-piece cover being is stretched over all three roof sections, the roof sections having supporting frame elements on each lateral side thereof and being contiguous with one another in the closed position of the vehicle covering system; pivoting the third, rear roof section in the direction of a tail of the vehicle, thereby lifting up the first, front roof section over the level of the top of the second, central roof section, moving the first, front roof section over the top of the second, central roof section by shifting the first, front roof section along a support hinged on the third, rear roof section, and simultaneously pivoting the first, front roof section together with the second, central roof section with respect to a third, rear roof section in the direction of a front end of the vehicle; depositing the third, rear roof section upside down in a bottom of the tail of the vehicle and depositing the first, front roof section together with the second, central roof section onto the third, rear roof section, thereby providing a folded terminal position with the roof sections being stacked over one another in a configuration in which the second, central roof section is sandwiched between said first, front roof section and said third, rear roof section.

This space-saving design can be effectively installed in the motor vehicle while at the same time providing for a substantially enhanced esthetic design of the covering system in the closed position. In addition, the space-saving closed position makes it possible to achieve a more favorable aerodynamic design, thus allowing for a significant reduction in the vehicle's drag coefficient. This is not only advantageous in terms of fuel consumption, but can also lead to a substantial reduction in wind noise.

Advantageously, the third, rear roof section comprises two articulated support rods at each side of the vehicle, each having an upper and a lower end, wherein the lower ends each are hinged to the vehicle at a pivot so that the articulated support rods can be pivoted in the direction of the tail of the vehicle around a swiveling axis formed by the pivots of their lower ends.

When the opening mechanism starts, the supporting frame elements of the first, front roof section and the second, central roof section are lifted away from a front and a rear side window as to remove the side window gaskets of said frame elements from the side windows.

The first and the second roof section each are pivoted in the direction of a front end of the vehicle around a moving swiveling axis in the region of the upper ends of the articulated support rods of the third roof section. Therefore it is possible to save even more space in the folded terminal position.

Further details, features and advantages of the invention will become readily apparent from the following description and the accompanying drawings.

DETAILED DESCRIPTION OF THE PREFERRED EMBODIMENT

A motor vehicle covering system 1 according to the invention is described below with reference to the figures. Identical elements are assigned with the same reference numbers in each drawing. For reasons of simplification and clarification, the drawings only show one side of the motor vehicle covering system. The correspondingly equipped other half of the system, a mirror image of the system described below, is located on the other side of the vehicle.

Figure 1:
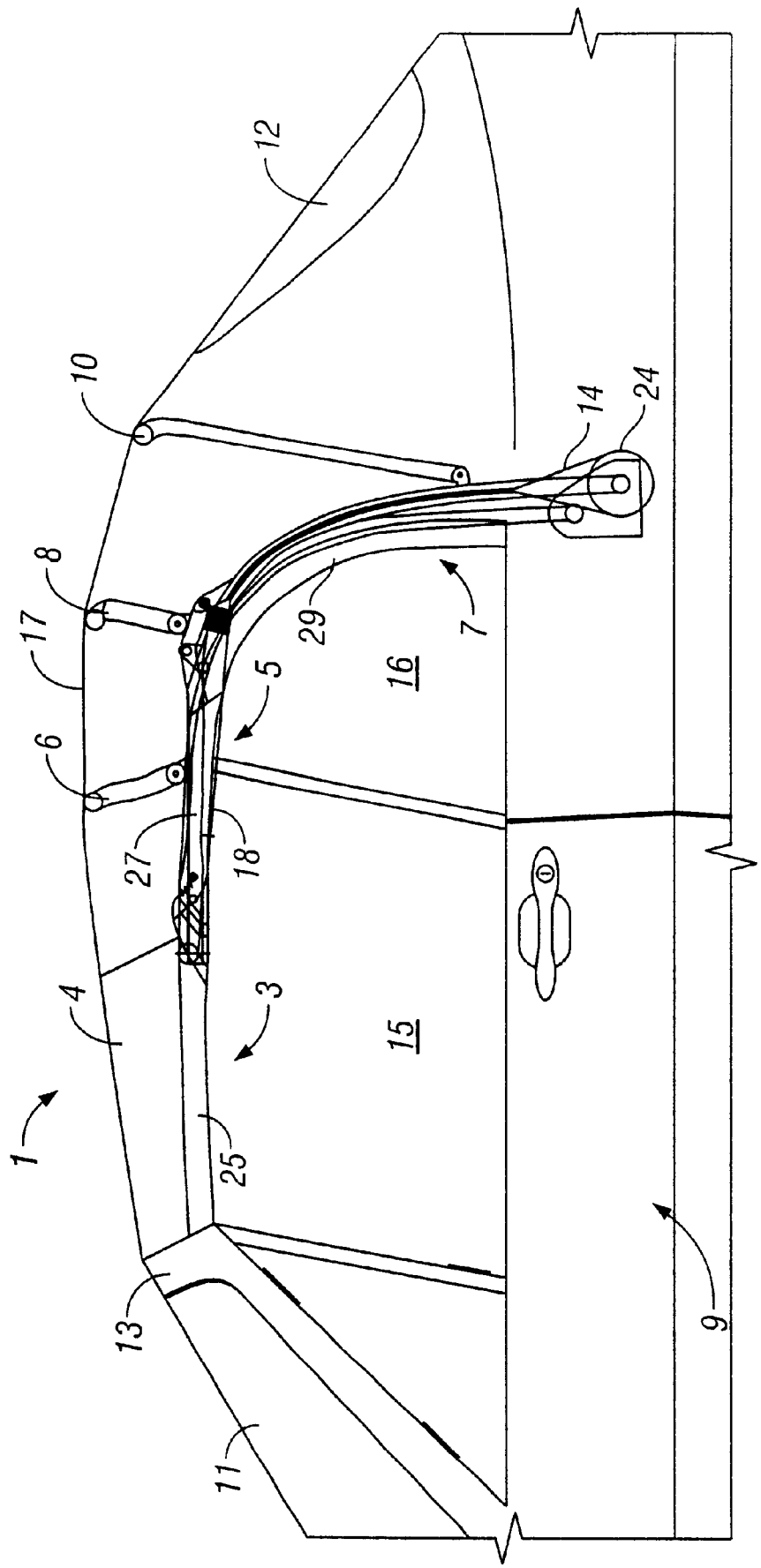
FIG. 1 is a schematic lateral view of a convertible equipped with a motor vehicle covering system according to the invention, wherein a cover is stretched over the three roof sections in a closed position of the covering system.
Figure 2:
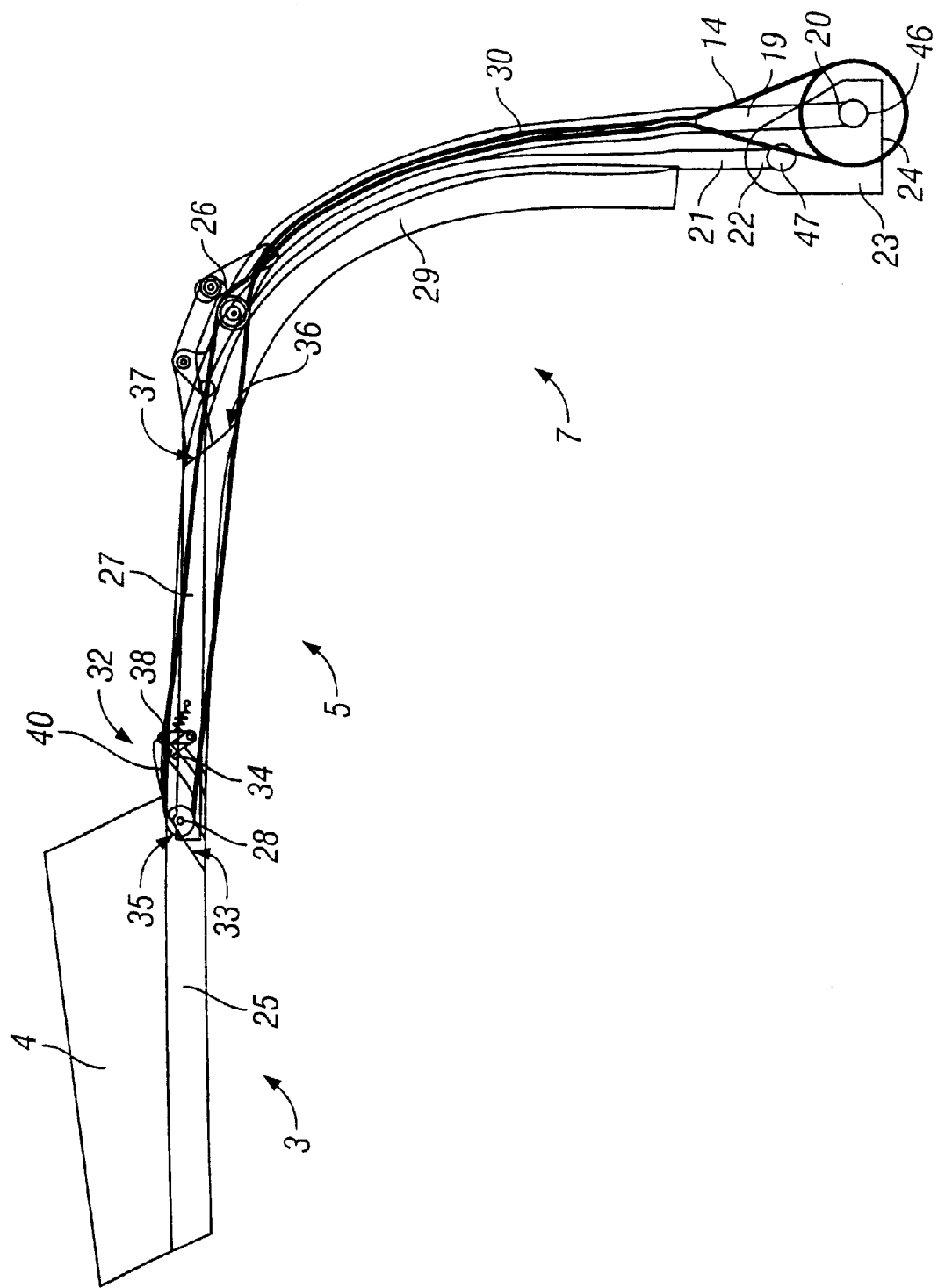
FIG. 2 is a schematic lateral view of the most relevant parts of the mechanism of the motor vehicle covering system according to FIG. 1.
Figure 3:
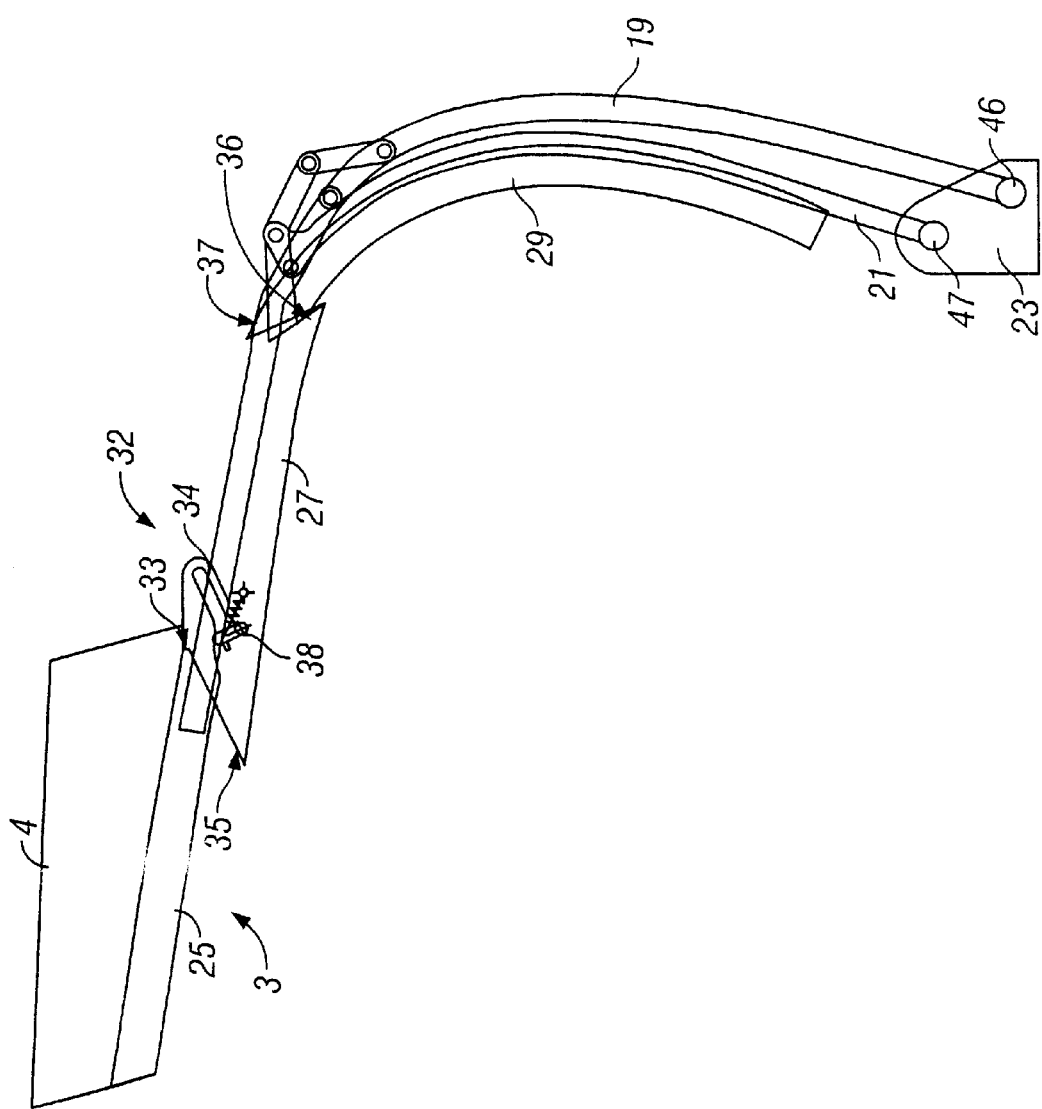
FIGS. 3 to 5 are schematic lateral views of the supporting elements of the three roof sections of the motor vehicle covering system according to FIG. 2 during successive stages of the opening process.

FIG. 1 shows a schematic lateral view of the preferred embodiment of the motor vehicle covering system according to the invention. The motor vehicle covering system 1 is installed in a convertible 9, which has a front side window 15 and a rear side window 16. The convertible 9 comprises a windshield 11 whose upper edge is framed by an apron 13, and is preferably constructed as a four-seated convertible. The motor vehicle covering system 1 comprises three roof sections, a first, front roof section 3, a second, central roof section 5 and a third, rear roof section 7, which are contiguous to each other in the closed position of the covering system 1, as shown in FIG. 1. It further comprises a fabric cover 17 that extends over the whole length of the roof.

Each of the roof sections 3, 5, 7 comprises a supporting frame element 25, 27, 29 is at each lateral side thereof that is equipped with suitable gaskets. The supporting frame element 25 of the first, front roof section 3 seals and supports the cover 17 along the front side window 15. The supporting frame element 27 of the second, central roof section 5 provides the same function to side windows 15 and 16, while the supporting frame element 29 of the third, rear roof section 7 suitably conforms to the contour of the rear side window 16. Between the two opposing supporting frame elements 25, 27, 29 of each roof section 3, 5, 7 a stable transverse connection is provided resulting in a better resistance of the covering system. The first, front roof section 3 comprises a hard top shell 4 connecting the two supporting frame elements 25 and providing high stability of this segment. When the convertible is closed, the hard top shell 4 is connected to the apron 13 in a sealing manner as known in the state of the art. The second, central roof section 5 comprises a transverse roof arch 6 that links the two supporting frame elements 27, and the third, rear roof section 7 comprises two transverse roof arches 8, 10 to link the opposing support rods (described below) of the third roof section 7. All transverse roof arches 6, 8, 10 are preferably built from aluminum and are convex or substantially U-shaped with a central transverse section and two articulated end sections. The end sections are linked to the frame elements 27, 29 or support rods via standard pivot mechanisms not described further.

The cover 17 is fixed at the hardtop shell 4, preferably by use of an adherent, and is stretched over the transverse roof arches 6, 8, 10 towards the tail of the vehicle. The transverse roof arches 6, 8, 10 are fixed to the cover 17 in any suitable manner, i.e. via sewing. The cover 17 can comprise a plastic rear window 12 in the region of the third roof section 7.

FIGS. 2 to 6 show the relevant elements of the opening device in schematic lateral views during successive steps of the opening process. As can be seen from the figures, the third, rear roof section 7 features two articulated support rods 19 and 21. Their lower ends 20 and 22 are hinged to a bearing 23 via two pivots 46, 47, while their upper sections curve in the direction of the front of the vehicle. The pivot 47 of the front rod 21 is arranged higher than the pivot 46 of the rear rod 19.

The supporting frame element 25 of the first, front roof section 3 comprises a connection surface 33 that is angled and engages with a reciprocally angled connection surface 35 of the supporting frame element 27 of the second, central roof section 5. Due to this arrangement, the first, front roof section 3 can easily be lifted over the second, central roof section 5. On its back end, the supporting frame element 27 of the second, central roof section 5 comprises a connection surface 36, which is angled in the other direction and combines with a connection surface 37 of the supporting frame element 29 of the third, rear roof section 7.

The mechanical arrangement providing the movement of the first roof section 3 over the top of the second roof section 5 and its shifting over this section comprises three rolls and two cables. The first cable 14 surrounds the first, biggest roll 24 which is mounted near pivot 46, and is lead to smaller roll 26, which is placed in the upper region of support rod 21, via a duct 30. The second cable 18 also surrounds roll 26 as well as roll 28 arranged at the front end on the inside of supporting frame element 27. On the inside of supporting frame element 25 a protruding section 32 is provided which comprises a hook 34 that, when the covering system 1 is closed, engages with the upper vertical leg of a L-shaped linking element 38 who is rotationally mounted on supporting frame element 27 with its other leg. The second cable 18 is fixed to the protruding section 32 at a predetermined point 40 so that motion of the cable 18 leads to a corresponding force resulting on the front roof section 3.

Figure 4:
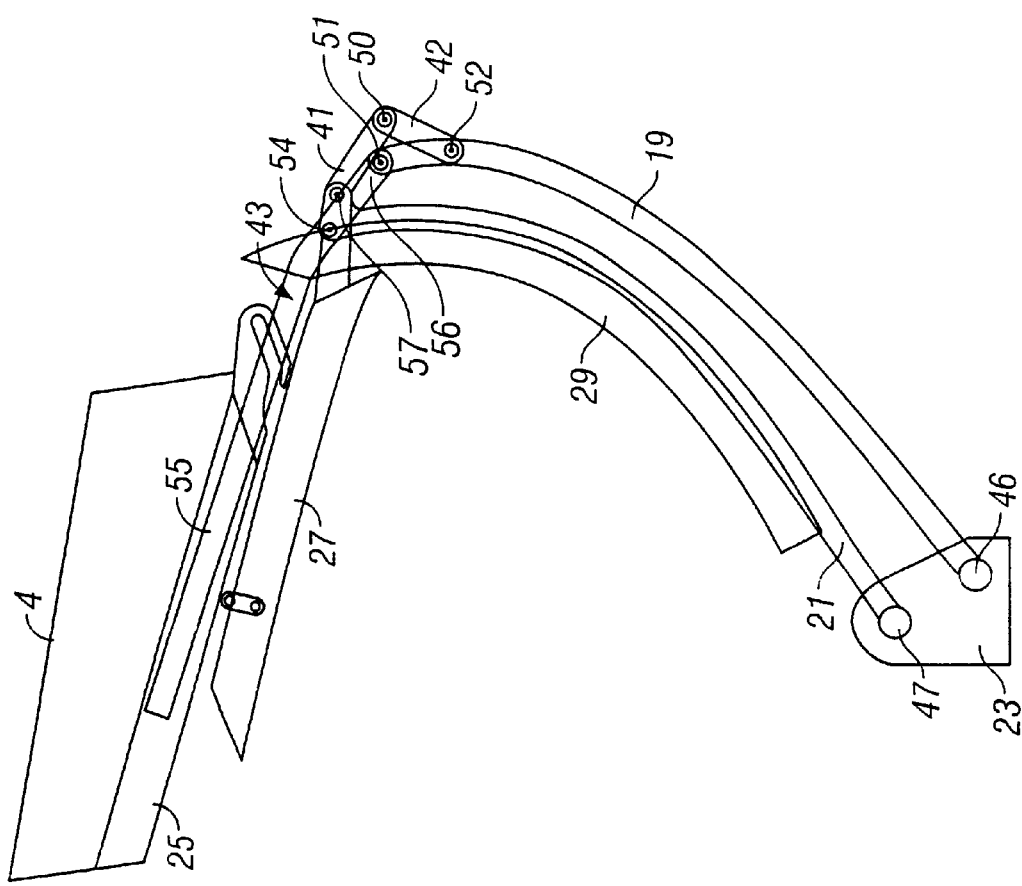
Figure 5:
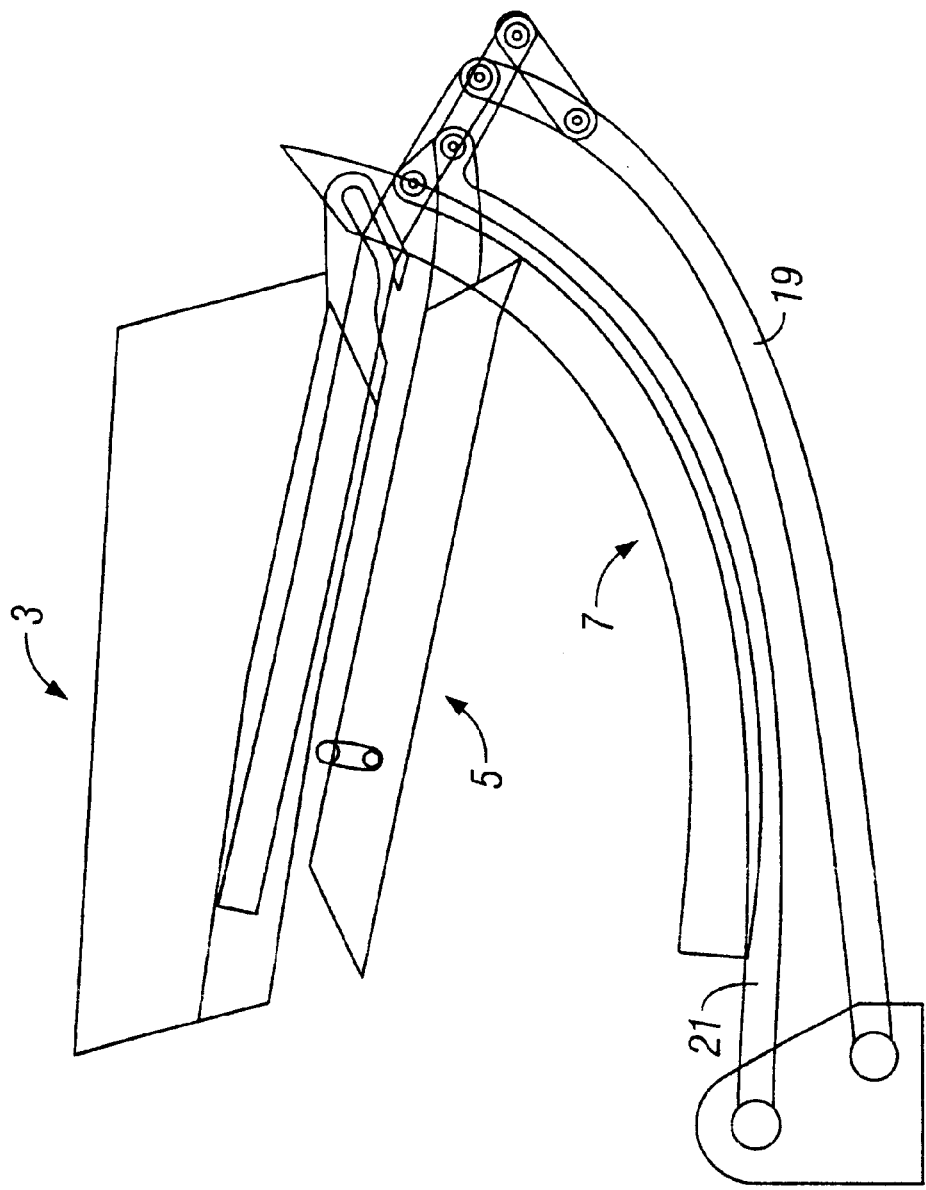
Figure 6:
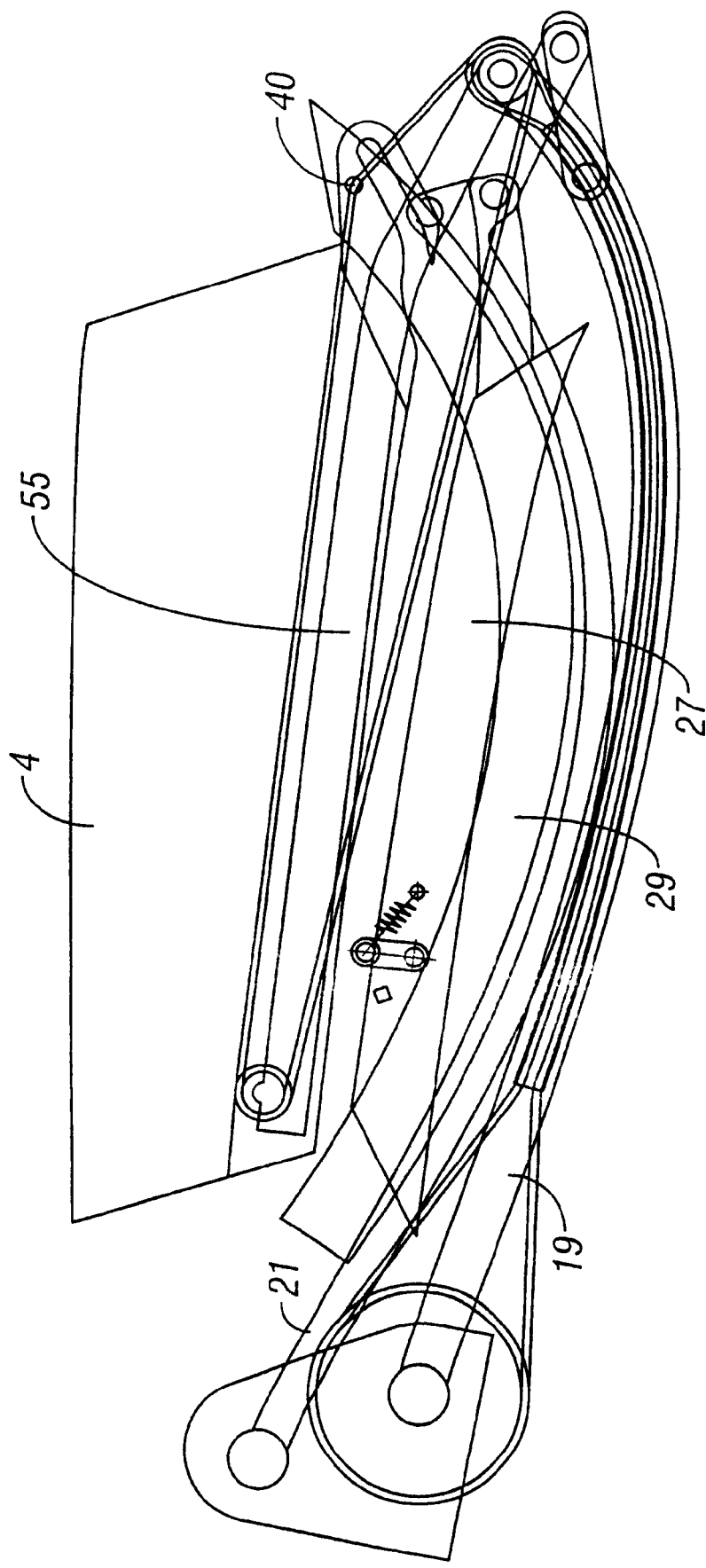
FIG. 6 is a schematic lateral view of the most relevant parts of the mechanism of the motor vehicle covering system according to FIG. 2 in the folded terminal position of the covering system.
Figure 7:
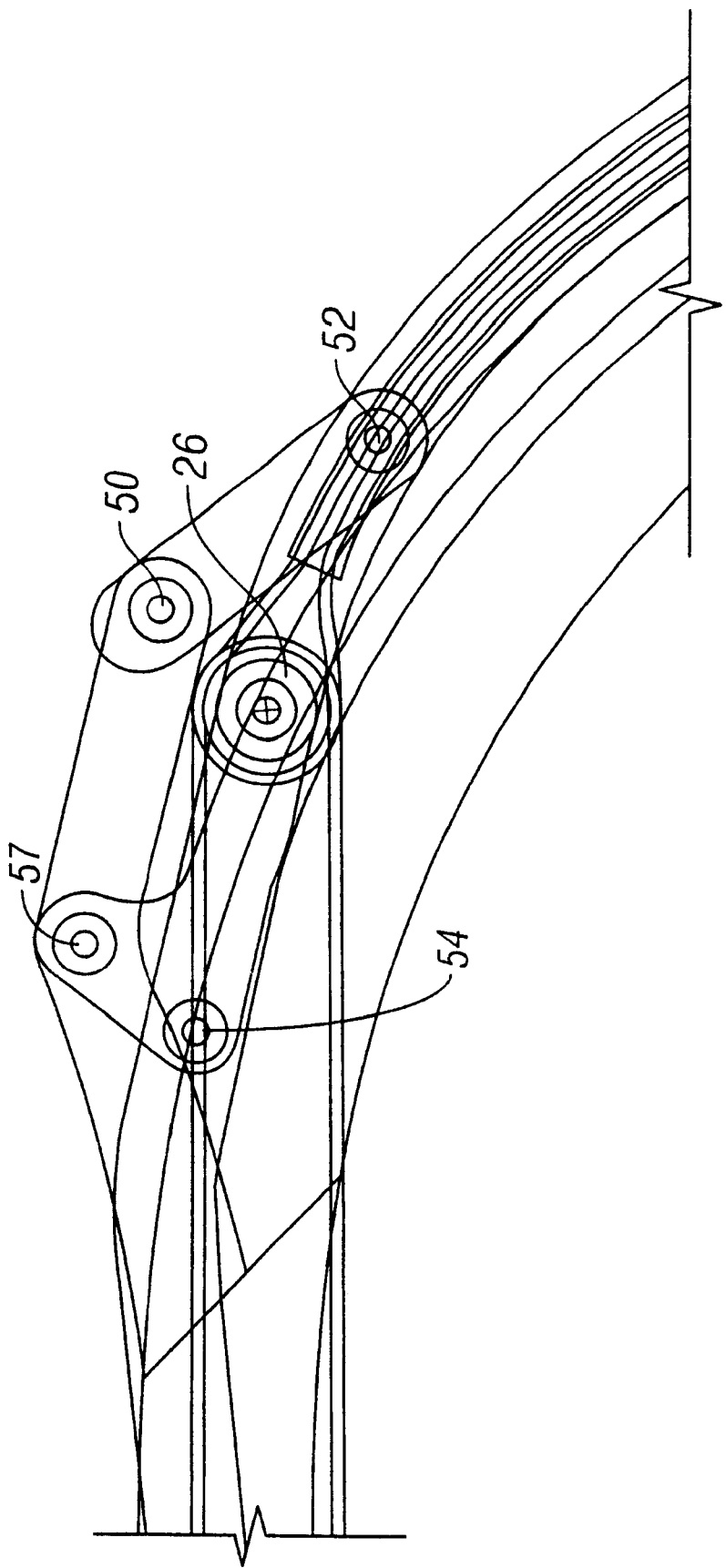
FIG. 7 is a schematic lateral view of the linkage means between third roof section and first as well as second roof section.

The lever mechanism of the covering system can be best explained according to FIG. 4. Rear articulated support rod 19 is linked with supporting frame element 27 via two levers 41 and 42. Lever 42 is fixed in the upper region of articulated support rod 19 in connection point 52 and extends upwards and slightly towards the tail of the vehicle 9. At the other end, lever 42 is rotationally linked with the slightly angled lever 41 at pivot 50. On its other end, lever 41 is mounted on supporting frame element 27.

A slightly angled support element 43 comprising a longer leg 55 for the linear shifting movement of the first roof section 3, is hinged to the upper end of support rod 19 with its shorter leg 56 in pivot 51. Articulated support rod 21 is at its upper end also linked to the shorter leg 56 in pivot 54 and to the center of lever 41 in pivot 57.

According to FIGS. 3 to 6, the individual stages of opening the motor vehicle covering system 1 are described below. First, the support rods 19, 21 of the third, rear roof section 7 are pivoted toward the rear driven by a motor. Due to the mechanical lever arrangement, the supporting frame elements 25 and 27 are lifted away from the side windows 15 and 16, while the first roof section 3 is pivoted farther upward guided by the upper leg of the linking element 38 in the hook 34. During this procedure, it moves up until it is positioned above the level of the top of the second roof section 5. Simultaneously, the roll 24 is driven, resulting in a corresponding movement of cable 14, roll 26, cable 18 and, via fixing point 40, a pulling force on the first roof section 3 towards the rear.

Figure 8:
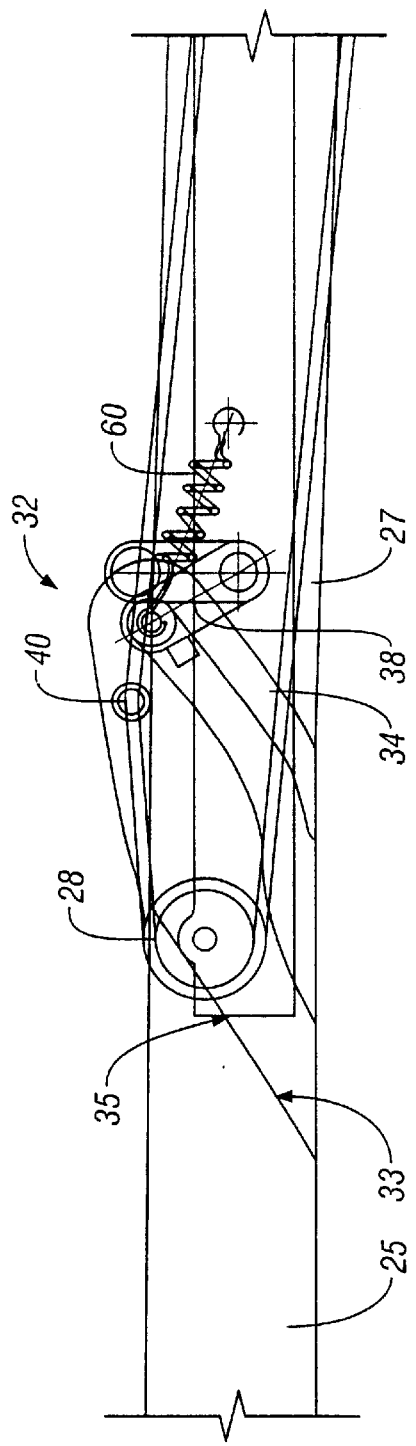
FIG. 8 is a schematic lateral view of the linkage means between the first and the second roof section in a closed position of the motor vehicle covering system.
Figure 9:
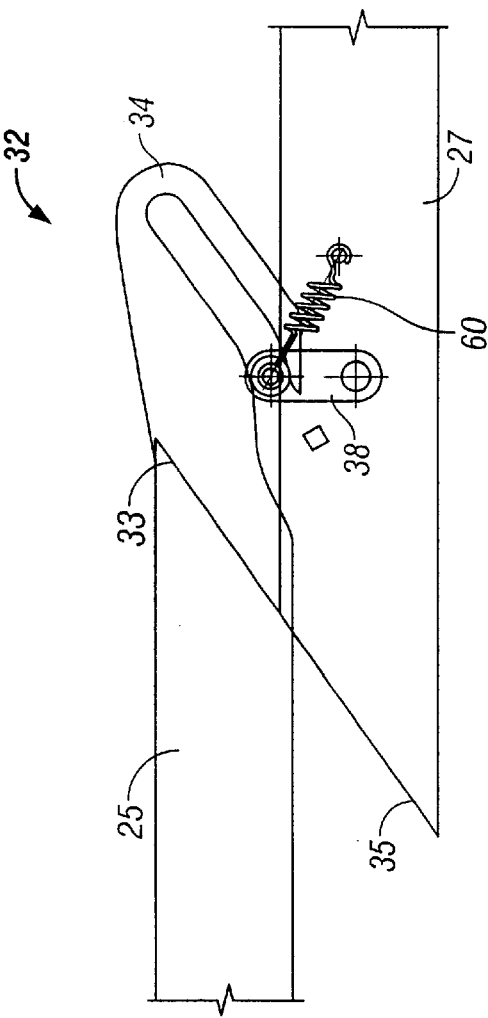
FIG. 9 is a schematic lateral view of the linkage means between the first and the second roof section when the first roof section has been partly lifted up over the second roof section.
Figure 10:
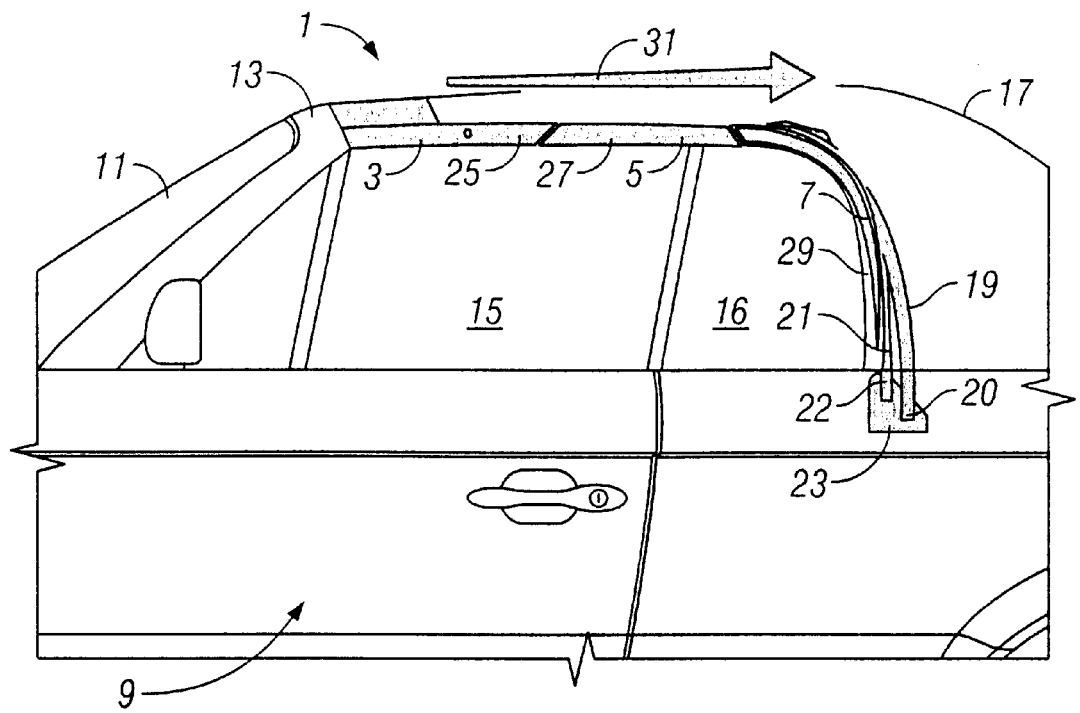
FIGS. 10 to 14 are schematic lateral views of a convertible equipped with a covering system according to the invention, showing the different successive steps of the opening process of the motor vehicle covering system from the closed position to the folded terminal position of the covering system.
Figure 11:
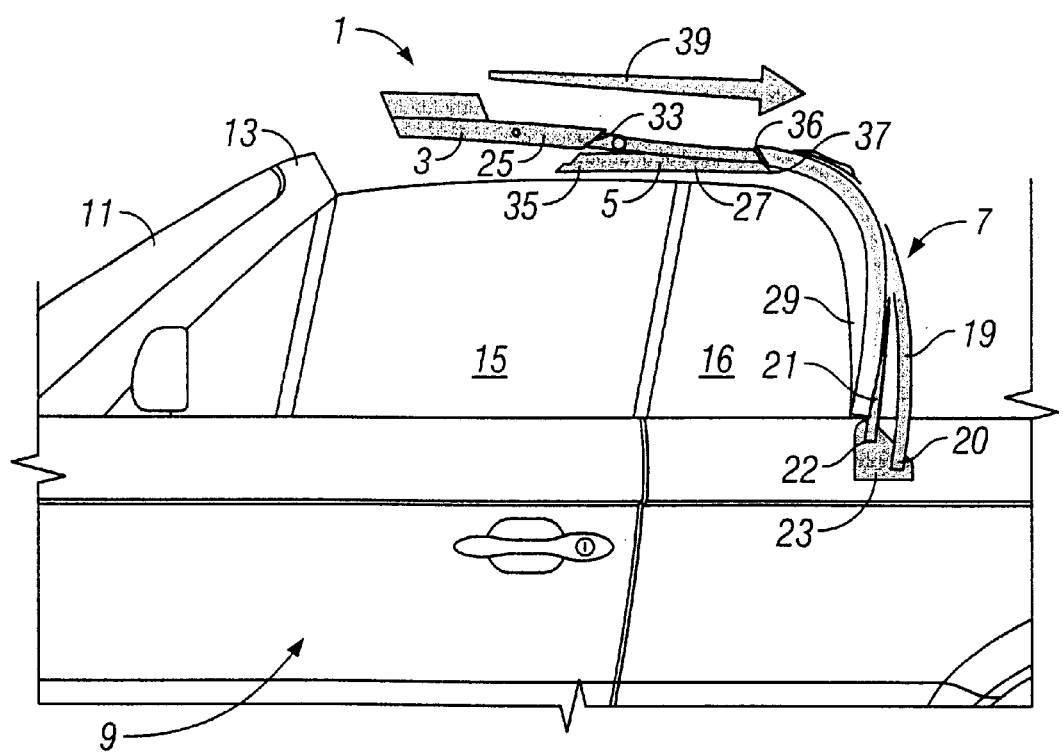
Figure 12:
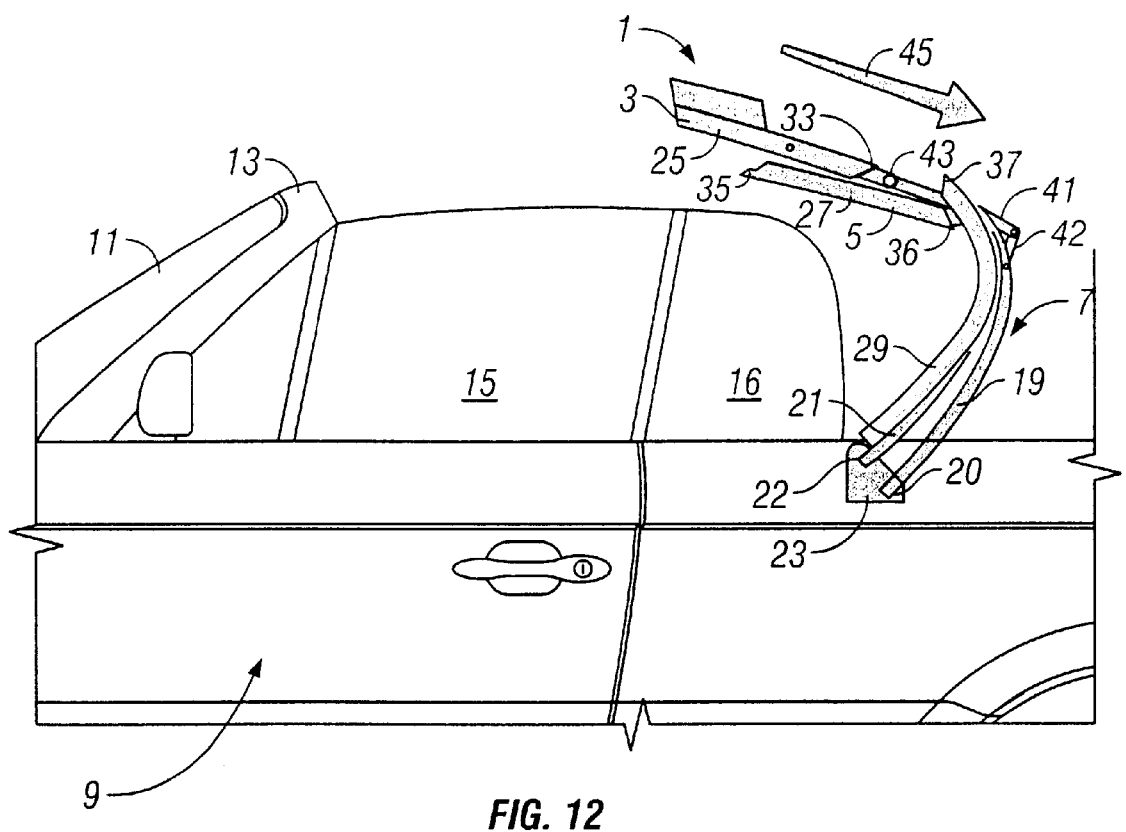
Figure 13:
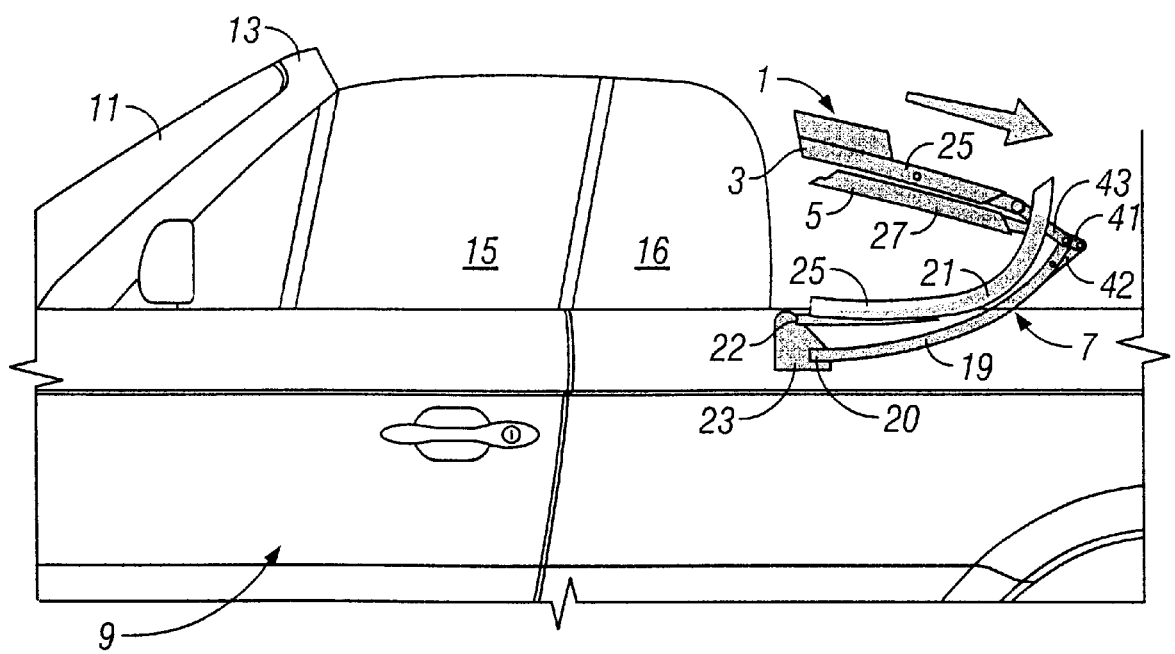
Figure 14:
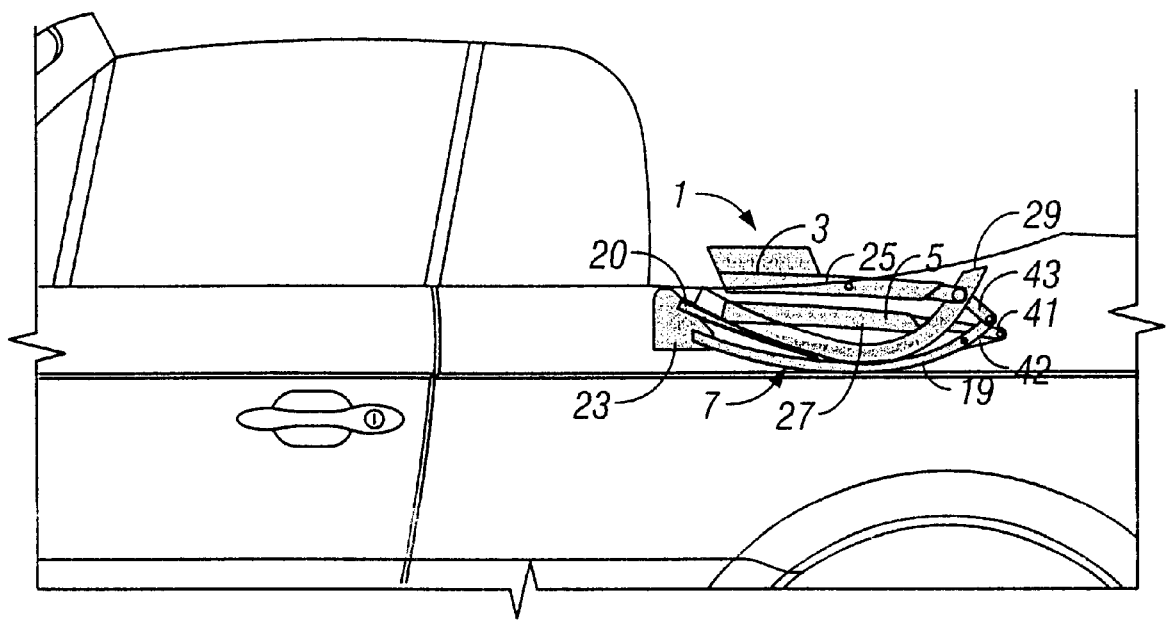

From FIGS. 8 and 9 it is apparent that the lower end of the linking element 38 is rotationally hinged to supporting frame element 27, while its upper vertical leg is inserted in the hook and is provided with a spring 60 that pulls the upper leg backwards. Therefore, during the first steps of the opening mechanism when the first roof section 3 is lifted up, the lower leg of the linking element 38 moves into vertical position, where it is held by any suitable means. When the covering system is closed again, the hook 34 encloses the vertical leg and pulls it down against the power of the spring 60.

When the third roof section 7 is moved farther backward, the first roof section 3 moves backward following the guidance of the longer leg 55 of support element 43 by means of the rotation of cable 18. Simultaneously, the first and the second roof sections fold in a flexible manner around a moving swiveling axis in the region of the upper ends of support rods 19, 21 in direction of the front of the vehicle.

Finally, the third, rear roof section 7 is deposited upside down in a bottom of the tail of the vehicle and the first, front roof section 3 is deposited together with the second, central roof section 5 onto the third, rear roof section7. In this folded terminal position the roof sections are stacked over one another in a configuration in which the second, central roof section 5 is sandwiched between the first, front roof section 3 and the third, rear roof section 7.

FIGS. 10 to 14 show the successive steps of the opening process of the motor vehicle covering system 1 from the closed position to the folded terminal position of a covering system installed in a convertible 9.

It is evident that because of the new opening mechanism the cover system can be folded into a space-saving terminal position. Furthermore, it can be lowered very far into the tail of the vehicle and therefore does not protrude beyond the tail section of the convertible. As a result, disadvantageous wind noises and elevated air resistance are clearly avoided. Thus, this invention provides a motor vehicle covering system that is especially suited for four-seated convertibles which must necessarily feature a longer roof.

Of course, various changes and modifications of the preferred embodiment described will be apparent to one skilled in the art. Such changes can be made without departing from the spirit and scope of the invention and without diminishing its attendant advantages. It is therefore intended that such changes and modifications be covered by the appended claims. For example, it should be clear that other mechanisms can be used to shift the first roof section backward, for example gears and chains and other known mechanisms.

What is claimed is:

1. A method for opening a vehicle covering system for a convertible, comprising the steps of:

providing a vehicle with a vehicle covering system comprising a first front roof section, a second, central roof section, a third, rear roof section, a support hinged on the third, rear roof section, and a one-piece cover being stretched over all three roof sections, wherein the roof sections have supporting frame elements on each lateral side and are contiguous with one another in a closed position of the vehicle covering system, and wherein the first, front roof section, is slidably mounted on the support hinged on the third, rear roof section;

pivoting the third, rear roof section in the direction of a tail of the vehicle, thereby lifting up the first, front roof section over the level of the top of the second, central roof section;

moving the first, front roof section over the top of the second, central roof section by sliding the first, front roof section along the support hinged on the third, rear roof section, and simultaneously;

pivoting the first, front roof section together with the second, central roof section with respect to the third, rear roof section in the direction of a front end of the vehicle; and depositing the third, rear roof section upside down in a bottom of the tail of the vehicle and depositing the first, front roof section together with the second, central roof section onto the third, rear roof section, thereby providing a folded terminal position with the roof sections being stacked over one another in a configuration in which the second, central roof section is sandwiched between said first, front roof section and said third, rear roof section.

2. The method as set forth in claim 1, comprising the step of providing the third, rear roof section with two articulated support rods at each side of the vehicle, said each having an upper and a lower end, wherein the lower ends each are hinged to the vehicle at a pivot, and the step of pivoting each of the articulated support rods in the direction of the tail of the vehicle around a swiveling axis formed by the pivots of their lower ends.

3. The method as set forth in claim 2, comprising the step of simultaneously lifting the first, front roof section and the second, central roof section away from a front and rear side window while lifting up the first, front roof section over the level of the top of the second, central roof section.

4. The method as set forth in claim 2, comprising the step of pivoting the first, front roof section and the second, central roof section with respect to the third, rear roof section in the direction of a front end of the vehicle around a moving swiveling axis in the region of the upper ends of said articulated support rods.

5. The method as set forth in claim 3, comprising the step of pivoting the first, front roof section and the second, central roof section with respect to the third, rear roof section in the direction of a front end of the vehicle around a moving swiveling axis in the region of the upper ends of said articulated support rods.

6. The method as set forth in claim 1, comprising the step of simultaneously lifting the first, front roof section and the second, central roof section away from a front and rear side window while lifting up the first, front roof section over the level of the top of the second, central roof section.

* * * * *